(12) United States Patent
Yang

(10) Patent No.: US 8,601,255 B2
(45) Date of Patent: Dec. 3, 2013

(54) APPROACHES FOR UPDATING BIOS

(75) Inventor: Abel Yang, Taipei (TW)

(73) Assignee: Phoenix Technologies Ltd., Milpitas, CA (US)

( * ) Notice: Subject to any disclaimer, the term of this patent is extended or adjusted under 35 U.S.C. 154(b) by 152 days.

(21) Appl. No.: 13/105,366

(22) Filed: May 11, 2011

(65) Prior Publication Data

US 2012/0239920 A1    Sep. 20, 2012

(30) Foreign Application Priority Data

Mar. 18, 2011 (TW) .............................. 1001094650A

(51) Int. Cl.
  *G06F 9/00* (2006.01)
  *G06F 9/24* (2006.01)
  *G06F 15/177* (2006.01)

(52) U.S. Cl.
  USPC ................................... 713/100; 713/1; 713/2

(58) Field of Classification Search
  USPC .................................................. 713/1, 2, 100
  See application file for complete search history.

(56) References Cited

U.S. PATENT DOCUMENTS

| | | | | |
|---|---|---|---|---|
| 5,797,023 | A * | 8/1998 | Berman et al. ................ | 713/324 |
| 6,167,532 | A * | 12/2000 | Wisecup ........................ | 714/23 |
| 6,185,696 | B1 * | 2/2001 | Noll ............................... | 714/6.1 |
| 6,584,559 | B1 * | 6/2003 | Huh et al. ..................... | 713/2 |
| 7,500,095 | B2 | 3/2009 | Mahmoud et al. | |
| 8,239,664 | B2 * | 8/2012 | Wu et al. ....................... | 713/1 |
| 2002/0066009 | A1 * | 5/2002 | Tung .............................. | 713/1 |
| 2003/0005277 | A1 * | 1/2003 | Harding et al. ................ | 713/2 |
| 2003/0126493 | A1 * | 7/2003 | Lee ................................ | 714/6 |
| 2003/0126511 | A1 * | 7/2003 | Yang et al. .................... | 714/39 |
| 2004/0015941 | A1 * | 1/2004 | Sekine ........................... | 717/168 |
| 2004/0193865 | A1 * | 9/2004 | Nguyen et al. ................ | 713/2 |
| 2004/0221147 | A1 | 11/2004 | Tseng | |
| 2005/0033954 | A1 * | 2/2005 | Wang et al. ................... | 713/2 |
| 2005/0081090 | A1 * | 4/2005 | Lin ................................ | 714/6 |
| 2006/0026415 | A1 | 2/2006 | Chen | |
| 2008/0288767 | A1 * | 11/2008 | Wang et al. ................... | 713/2 |
| 2009/0327686 | A1 | 12/2009 | Kochar et al. | |
| 2010/0030991 | A1 | 2/2010 | Liu et al. | |
| 2010/0077199 | A1 | 3/2010 | Hobson et al. | |

OTHER PUBLICATIONS

GA-EP45-DQ6 LGA775 socket motherboard for Intel Core processor family/Intel Pentium processor family/Intel Celeron processor family: User's Manual, 2008, GIGA-BYTE Technology Co., Rev. 1004, pp. 36-37 and 74-76.*

* cited by examiner

*Primary Examiner* — Mark Connolly
(74) *Attorney, Agent, or Firm* — Brokaw Patent Law PC; Christopher J. Brokaw

(57) ABSTRACT

Approaches for updating a Basic Input/Output System (BIOS) program used in a computer system. The computer system includes a central processing unit (CPU) and a non-volatile memory. The non-volatile memory is used to store the BIOS program, and the BIOS program includes a booting area and a program area for storing a first BIOS image file. The update method includes: duplicating a second BIOS image file from an external storage device of the computer system to a designated area of an internal non-volatile storage device of the computer system; changing a flag from a first status to a second status after the duplication is completed; checking the status of the first BIOS image file when the computer system is booted; and booting the computer system by the first BIOS image file or the second BIOS image file according to the status of the first BIOS image file.

15 Claims, 5 Drawing Sheets

PRIOR ART

APPROACHES FOR UPDATING BIOS

CLAIM OF PRIORITY

This application claims priority to Taiwanese Patent Application No. 100109465, filed Mar. 18, 2011, entitled "BIOS Update Method and Computer System Using the Same," which is hereby incorporated by reference for all purposes as if fully set forth herein.

FIELD OF THE INVENTION

Embodiments of the invention generally relate to approaches for updating a basis input/output system (BIOS) program.

BACKGROUND

When a computer system is booted, a CPU executes a basis input/output system (BIOS) program stored in an external memory to complete a boot process. The external memory is generally a non-volatile memory. The BIOS program is very basic software program code on a hardware system of a motherboard, and has main functions including, for example, Power-On Self-Test (POST) of the computer system, initialization action, provision of basic set value of elements, and provision of resident program library.

FIG. 1 is a block diagram of a typical computer system 10 having a BIOS program. Referring to FIG. 1, the computer system 10 includes a CPU 12, a chip set 14, and a non-volatile memory 16. The chip set 14 includes a north bridge chip 142 and a south bridge chip 144. The chip set 14 mainly acts as a bridge for communication between the CPU 12 and other peripheral members, and the non-volatile memory 16 is used to store the BIOS program of the computer system 10.

FIG. 2 shows contents of a typical BIOS program. Referring to FIG. 2, the BIOS program 20 includes a booting area 22 and a program area 24. The program area 24 is used to store a BIOS image file, including BIOS program code.

In operation, when a user enables a power switch of the computer system 10, the CPU 12 executes the program code in the booting area 22 first. Before the execution of the BIOS, the system verifies whether other parts of the BIOS are normal with a checksum function. After the check of the booting area 22 is completed successfully, the CPU 12 executes the program code in the program area 24 so as to perform POST, thereby determining whether hardware members such as a memory controller, a keyboard controller, a communication controller, a software controller, and a hardware controller are functioning normally. In this stage, BIOS also initializes basic hardware, such as memory, video card, and motherboard chip set. After the execution of the BIOS program, the computer system 10 is successfully booted, and an Operating System (OS) may be enabled.

As computer software and hardware technology are developing rapidly at present, in order to further improve the compatibility and performance of computer systems, it is necessary to update the BIOS program frequently. In conventional updates of the BIOS program, if the update fails, the computer system can only be booted in the booting area. However, the capacity of the booting area is limited, and thus only specific devices on the computer system are initialized. A user needs to reload an update program or the BIOS image file from a floppy disk driver or an optical disk driver, so as to re-record the BIOS image file to an external memory, which consumes a significant amount of time.

In addition, in conventional update methods, the update program and the BIOS image file can be duplicated into a program area of a non-volatile memory after loading into the OS. Because the computer system generally needs to simultaneously execute multiple application programs in the OS, the BIOS update action may be interfered with by other application programs, and thus the update may fail. In addition, in the process of updating the BIOS, data damage may be caused by failed update due to powering off, such that the computer system cannot be booted. In these cases, the computer system must be delivered back to the manufacturer for repair of the BIOS program, thus incurring extensive loss of time and cost to the user.

Therefore, it is desirable to provide an improved update method of the BIOS program, so as to solve the above problems.

SUMMARY OF THE INVENTION

The present invention is directed to a computer system having a BIOS. In one embodiment of the present invention, the computer system is externally connected to a storage device. The computer system includes a CPU, a first storage unit, a second storage unit, a third storage unit, and a controller. The first storage unit is used to store a BIOS program, in which the BIOS program includes a booting area and a program area used to store a first BIOS image file. The controller is electrically connected between the second storage unit and the storage device, and used to duplicate a second BIOS image file in the storage device to a designated area in the second storage unit. The third storage unit is used to store a flag. After the second BIOS image file is duplicated into the designated area, the flag is changed from a first status to a second status. When the computer system is booted, the CPU checks the status of the first BIOS image file, and determines whether to boot the computer system by the first BIOS image file or by the second BIOS image file according to the status of the first BIOS image file.

The present invention is further directed to an update method of a BIOS program, which is applicable in a computer system. The computer system includes a CPU and a non-volatile memory. The non-volatile memory is used to store the BIOS program, and the BIOS program includes a booting area and a program area used to store a first BIOS image file. The update method includes duplicating a second BIOS image file from an external storage device of the computer system to a designated area of the internal non-volatile storage device of the computer system; changing a flag from a first status to a second status after the duplication is completed; checking the status of the first BIOS image file; and booting the computer system by the first BIOS image file or the second BIOS image file according to the status of the first BIOS image file.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Discussions in the present invention are directed to an update method of a BIOS program and a computer system. In order to make the present invention more comprehensive, detailed steps and structures are described below. The implementation of the present invention is not limited to specific details well known to persons skilled in the art. Structures and steps that are well known are not described in detail, so as to avoid unnecessary limitations on the present invention. Preferred embodiments of the present invention are described in detail below; however, in addition to the detailed descriptions, the present invention may be broadly implemented in other embodiments, and the present invention is not limited thereto, but falls into the scope as defined by the claims below.

Figure 1:
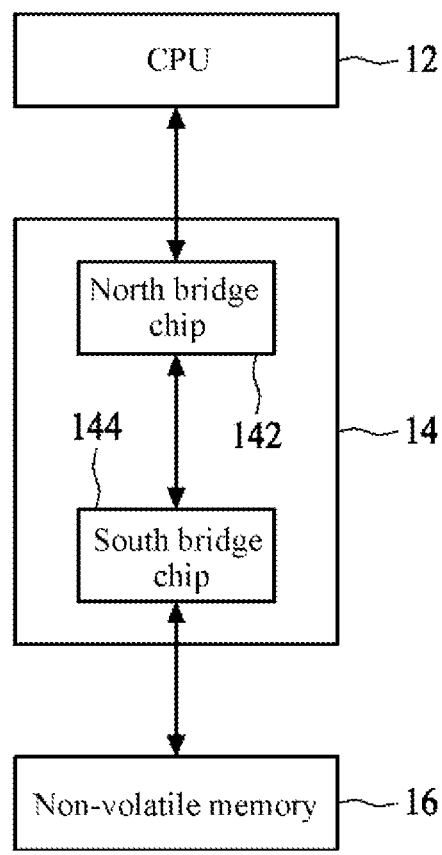
FIG. 1 is a block diagram of a typical computer system having a BIOS program.
Figure 2:
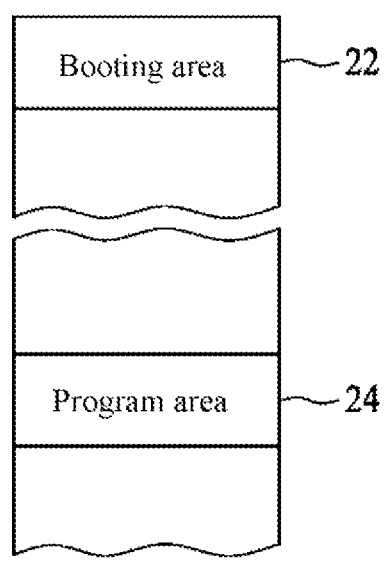
FIG. 2 shows contents of a typical BIOS program.
Figure 3:
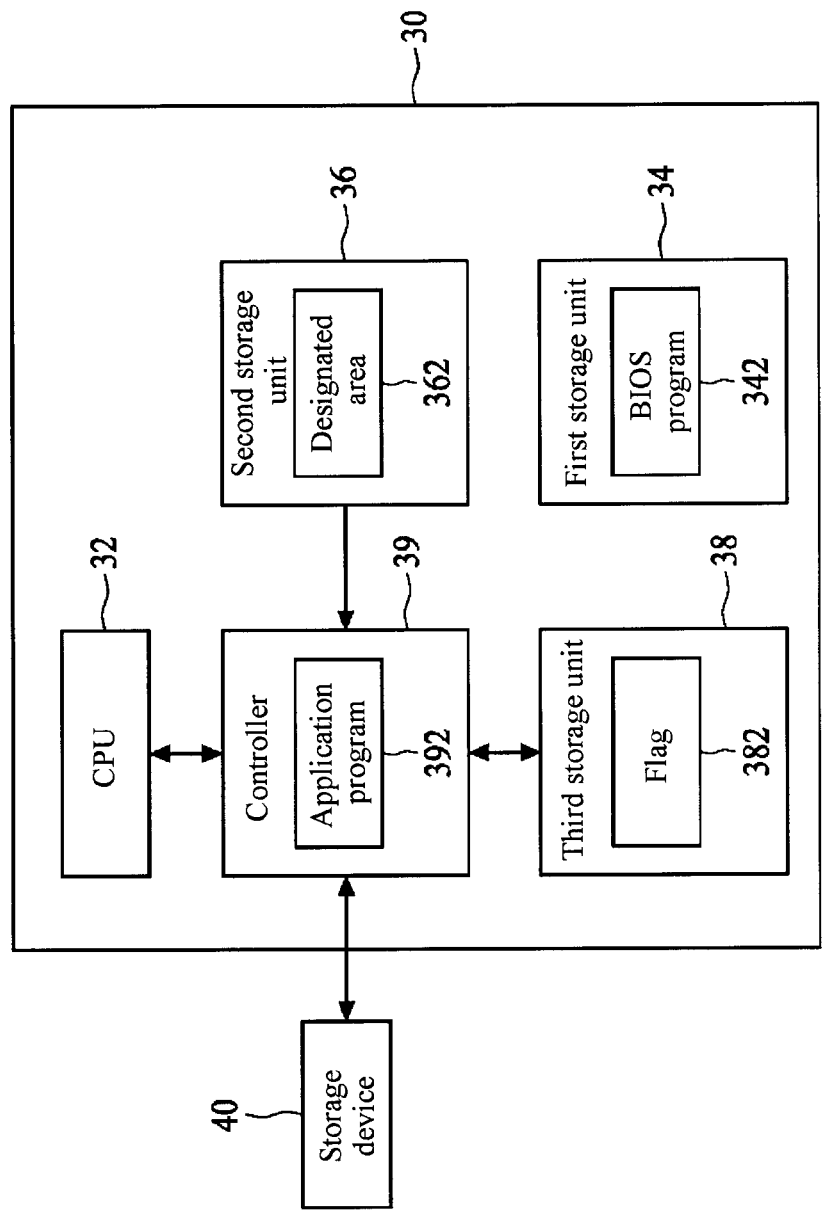
FIG. 3 shows a computer system according to an embodiment of the present invention.

In order to more clearly illustrate the update method of the BIOS program according to the present invention, a computer system for implementing the method of the present of the present invention is described below. FIG. 3 shows a computer system 30 according to an embodiment of the present invention, which includes a CPU 32, a first storage unit 34, a second storage unit 36, a third storage unit 38, and a controller 39. The computer system 30 may be a personal computer (for example, a desktop computer, a notebook computer, a tablet computer, or other suitable computation device), a work station, a server, a Personal Digital Assistant (PDA), or other suitable device.

Figure 4:
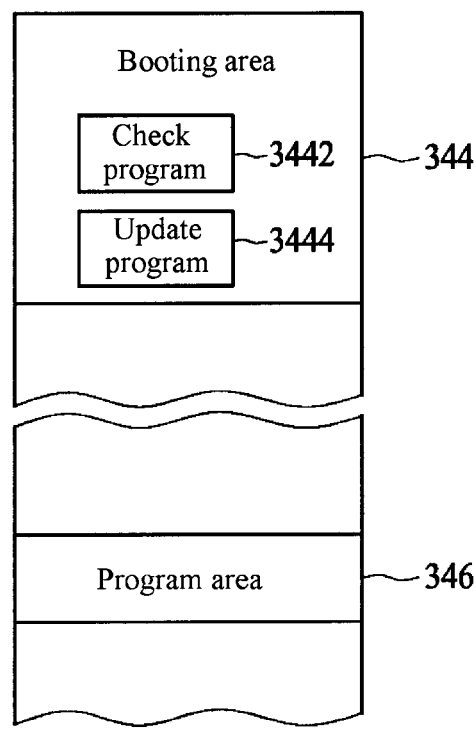
FIG. 4 shows contents of a BIOS program stored in a first storage unit.

Referring to FIG. 3, the first storage unit 34 is used to store a BIOS program 342. FIG. 4 shows contents of the BIOS program 342 stored in the first storage unit 34. Referring to FIG. 4, the BIOS program 342 includes a booting area 344 and a program area 346. The booting area 344 is a boot block, and initial content such as initiation program and initiation parameters stored therein are not permitted to be changed by a user, so as to prevent the situation where the computer system 30 cannot be booted due to the damage of the content. The program area 346 is used to store a BIOS image file including BIOS program code. If the hardware or software on the computer system is changed, it is necessary to update the content of the BIOS image file, such that the computer system can maintain preferred compatibility and performances. In an embodiment of the present invention, in order to prevent the BIOS program 342 stored in the first storage unit 34 from being affected by interruption to the power supply and ensure that the BIOS program 342 can maintain its stored data, the first storage unit 34 may be implemented as a flash memory, a Programmable Read-Only Memory (PROM), or an Electrically-Erasable Programmable Read-Only Memory (EEPROM).

Referring to FIG. 3, when the computer system 30 is booted, the CPU 32 first executes the BIOS program 342 stored in the first storage unit 34. After the execution of the BIOS program 342, the computer system 30 completes the boot process. At this time, the computer system 30 may enable an OS, for example, a Windows system or a Linux system. The CPU 32 may be a micro-processor, a micro-controller, or another device used to execute a set of initial instructions. In addition, the CPU 32 may include an Arithmetic Logic Unit (ALU) used to execute computation, one or more registers used to temporarily store data and instructions, and a controller.

Referring to FIG. 3, a storage device 40 is externally connected to the computer system 30. The storage device 40 may be, but is not limited to, an optical disk, a floppy disk, a hard disk, or a Universal Serial Bus (USB) device. The storage device 40 is used to store a BIOS image file. The BIOS image file may be a copy of the BIOS image file stored in the first storage unit 34, or a latest version of the BIOS image file issued by a manufacturer of the computer system 30.

The controller 39 is electrically connected between the second storage unit 36 and the storage device 40, as shown in FIG. 3. In this embodiment, the second storage unit 36 is a non-volatile storage device located in the computer system 30, for example, a hard disk, a flash memory, a Read-Only Memory (ROM), or any other device capable of storing data during an interruption of power supply. The controller 39 includes an application program 392, which is used to duplicate the BIOS image file stored in the storage device 40 to a designated area 362 in the second storage unit 36. The designated area 362 is preferably an area inaccessible to an end user of the computer system 30. That is, the designated area 362 may be an area which is not partitioned and defined in the hard disk. Therefore, the end user cannot change files and set values in the designated area 362.

Referring to FIG. 3, the third storage unit 38 is used to store a flag 382, which indicates an execution status of the application program 392 in the controller 39. The flag 382 is preset to a first status (for example, bit 0). When the application program 392 completes the duplication action, the controller 39 sets the flag 392 to a second status (for example, bit 1), so as to indicate that the duplication was successful. In order to ensure that the flag value is not arbitrarily changed by the end user of the computer system 30, and does not disappear with the shut-off of power of the computer system, in this embodiment, the third storage unit 38 may be implemented as a Complementary Metal Oxide Semiconductor (CMOS) memory. The power required by the CMOS memory is supplied by a separate cell, known as a Real-Time Clock (RTC), on the motherboard. In addition, in an embodiment of the present invention, the flag 382 may be stored in a specific area in the first storage unit 34.

Figure 5:
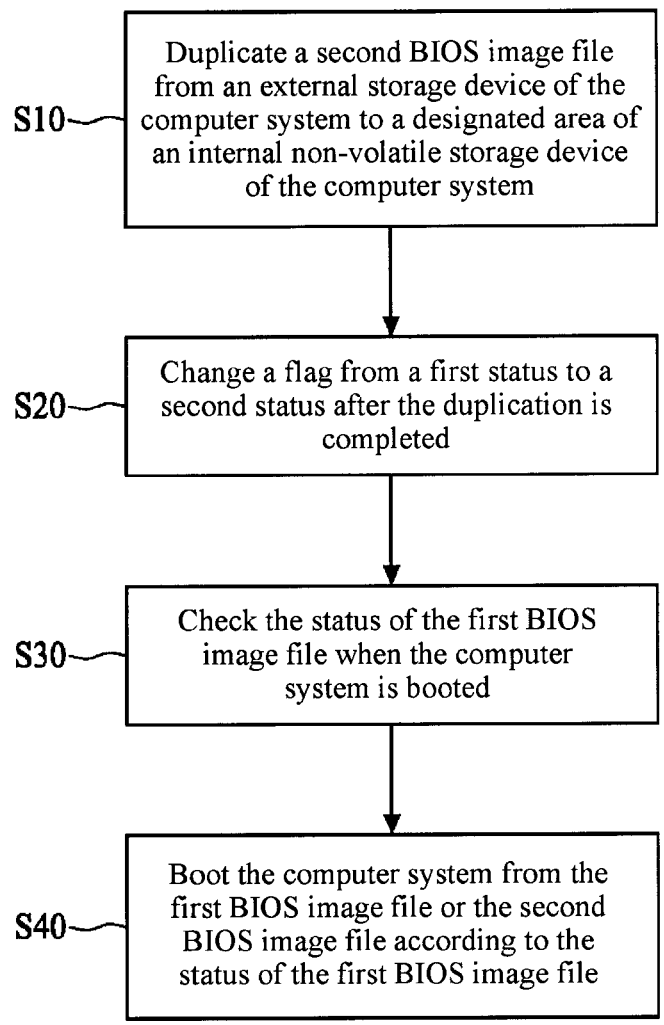
FIG. 5 is a flowchart of an update method of a BIOS program according to an embodiment of the present invention.

FIG. 5 is a flowchart of an update method of a BIOS program according to an embodiment of the present invention. The update method is applicable in a computer system. The computer system includes a CPU and a non-volatile memory. The non-volatile memory is used to store the BIOS program. The BIOS program includes a booting area and a program area used to store a first BIOS image file. The update method includes: duplicating a second BIOS image file from an external storage device of the computer system to a designated area of an internal non-volatile storage device of the computer system (Step S10); changing a flag from a first status to a second status after the duplication is completed (Step S20); checking the status of the first BIOS image file (Step S30); and booting the computer system by the first BIOS image file or the second BIOS image file according to the status of the first BIOS image file (Step S40). Details of the update method of the present invention are described below with reference to hardware architecture as shown in FIGS. 3 and 4.

First, as shown in FIG. 3, in an embodiment of the present invention, the controller 39 duplicates the BIOS image file stored in the external storage device 40 of the computer system 30 to the designated area 362 in the internal second storage unit 36 of the computer system 30 by using the application program 392. In this embodiment, the designated area 362 in the second storage unit 36 is an area in the hard disk which is inaccessible to the end user of the computer system. Therefore, the files and set values stored in the designated area 362 cannot be changed by the end user. After the application program 392 completes the duplication, the flag 382 stored in the third storage unit 38 is changed from the preset first status to the second status.

When the computer system 30 is booted, the program code of the booting area 344 of the BIOS program 342 is executed first to perform an initialization operation. In an embodiment of the present invention, the booting area 344 includes a check program 3442, as shown in FIG. 4. The check program 3442 checks whether the BIOS image file in the program area 346 is damaged by using, for example, a signature, a checksum, a version code, and a date code. If the BIOS image file in the program area 346 is damaged, the BIOS image file stored in the storage device 40 is rewritten to the BIOS image file in the program area 346 by an update program 3444 in the booting area 344. Next, the computer system 30 is booted from the updated BIOS image file, and subsequent boot actions can then be performed.

Alternatively, if the BIOS image file in the program area 346 is in a normal status, the CPU 32 checks the status of the flag 382 to determine whether to boot the computer system 30 from the BIOS image file in the program area 346 or from the BIOS image file stored in the storage device 40. In an embodiment of the present invention, when the flag 382 is in the first status, it indicates that the storage device 40 is not storing an updated BIOS image file. Therefore, the computer system 30 is booted from the BIOS image file in the program area 346. On the other hand, when the flag 382 is in the second status, it indicates that the application program 392 has executed the duplication action, and thus the BIOS image file in the program area 346 should be updated to the BIOS image file stored in the storage device 40. After the BIOS image file in the program area 346 is updated, the flag 382 is restored to the first status. Therefore, the computer system 30 executes the program code in the updated program area 346, so as to perform POST, initialize hardware equipment, and record system set values. After the execution of the BIOS program, the computer system 30 can be successfully booted and the OS is enabled.

According to the system and method disclosed in the present invention, a backup BIOS image file is stored in the internal second storage unit 36 of the computer system 30. Therefore, when the update of the BIOS image file fails, for example when data damage is caused due to a power failure during the update process, the computer system 30 can still execute the backup BIOS image file stored in the second storage unit 36. Accordingly, when the check program 3442 finds that the BIOS image file in the program area 346 is damaged, the BIOS image file in the program area 346 can be automatically restored by using the BIOS image file in the second storage unit 36, and the computer system can be successfully booted. In another embodiment of the present invention, the controller 39 duplicates the BIOS image file in the storage device 40 to the designated area 362 in the second storage unit 36 before the computer system 30 enables the OS. Because the update of the BIOS program is not implemented under the OS, the interference of the BIOS update program by other programs running in the OS can be effectively avoided.

The units according to the embodiment of the present invention, such as the controller, can be implemented as total hardware, total software, or elements including hardware and software. In addition, the units may also be implemented as computer program products. The computer program products may be accessed with computer-available or computer-readable media, which provide program code to execute the system operations by a computer, or any instructions, or by connecting to a computer. The computer-available or computer-readable media may be any device that can contain, store, communicate, transmit, or transfer a program, so as to execute the system operations by a computer, or any instructions, or by connecting to a computer.

Although technical contents and features of the present invention are described above, replacements and modifications can be made by persons skilled in the art based on the teachings and disclosure of the present invention, without departing from the spirit of the present invention. Therefore, the protection scope of the present invention is not limited the embodiments disclosed, but includes various replacements and modifications without departing from the spirit of the present invention as defined in the claims below.

What is claimed is:

1. A computer system having a Basic Input/Output System (BIOS), externally connected to a storage device, the computer system comprising:
   a central processing unit (CPU);
   a first storage unit for storing a BIOS program, wherein the BIOS program comprises a booting area and a program area used to store a first BIOS image file,
   wherein the booting area comprises a check program that is used to check the status of the first BIOS image file before the computer system is booted;
   a second storage unit;
   a controller, electrically connected between the second storage unit and the storage device, and used to duplicate a second BIOS image file in the storage device to a designated area in the second storage unit,
   wherein the designated area of the second storage unit is an area inaccessible to an end user of the computer system; and
   a third storage unit for storing a flag;
   wherein after the second BIOS image file is duplicated into the designated area, the flag is changed from a first status to a second status;
   wherein the CPU checks the status of the first BIOS image file and programmatically determines, without human intervention, whether to boot the computer system by the first BIOS image file or the second BIOS image file according to the status of the first BIOS image file and the status of the flag, and
   wherein the controller duplicates the second BIOS image file in the storage device to the designated area in the second storage unit before the computer system enables an Operating System (OS),
   wherein when the first BIOS image file is in a normal status, the CPU checks the status of the flag to determine whether to boot the computer system by the first BIOS image file or by the second BIOS image file, and
   wherein when the flag is in the first status, the computer system is booted by the first BIOS image file, and when the flag is in the second status, the computer system is booted by the second BIOS image file.

2. The computer system according to claim 1, wherein when the first BIOS image file is damaged, the computer system is booted by the second BIOS image file.

3. The computer system according to claim 1, wherein the booting area comprises an update program, which is used to update program code in the program area to the second BIOS image file.

4. The computer system according to claim 1, wherein the first storage unit is a flash memory, a Programmable Read-Only Memory (PROM), or an Electrically-Erasable Programmable Read-Only Memory (EEPROM).

5. The computer system according to claim 1, wherein the second storage unit is a hard disk.

6. The computer system according to claim 1, wherein the third storage unit is a cell-powered memory.

7. The computer system according to claim 6, wherein the third storage unit is a Complementary Metal Oxide Semiconductor (CMOS) memory.

8. An update method of a Basic Input/Output System (BIOS) program, applicable in a computer system, the computer system comprising a central processing unit (CPU) and a non-volatile memory used to store the BIOS program, and the BIOS program comprising a booting area and a program area used to store a first BIOS image file, the update method comprising:
  duplicating a second BIOS image file from an external storage device of the computer system to a designated area of an internal non-volatile storage device of the computer system,
  wherein the designated area of the second storage unit is an area inaccessible to an end user of the computer system;
  wherein duplicating the second BIOS image file from the external storage device to the designated area is completed before the computer system enables an Operating System (OS);
  changing a flag from a first status to a second status after the duplication is completed;
  checking, before the computer system is booted, the status of the first BIOS image file using a check program comprised within the booting area; and
  booting, without human intervention, the computer system by the first BIOS image file or by the second BIOS image file according to the status of the first BIOS image file and the status of the flag,
  wherein when the first BIOS image file is in a normal status, the CPU checks the status of the flag to determine whether to boot the computer system by the first BIOS image file or by the second BIOS image file, and
  wherein when the flag is in the first status, the computer system is booted by the first BIOS image file, and when the flag is in the second status, the computer system is booted by the second BIOS image file.

9. The update method according to claim 8, wherein the step of booting the computer system by the first BIOS image file or by the second BIOS image file further comprises:
  if the first BIOS image file is damaged, booting the computer system by the second BIOS image file.

10. The update method according to claim 8, wherein the booting area comprises an update program, used to update program code in the program area to the second BIOS image file.

11. The update method according to claim 8, wherein the first storage unit is a flash memory, a Programmable Read-Only Memory (PROM), or an Electrically-Erasable Programmable Read-Only Memory (EEPROM).

12. The update method according to claim 8, wherein the flag is stored in a cell powered memory.

13. The update method according to claim 12, wherein the flag is stored in a Complementary Metal Oxide Semiconductor (CMOS) memory.

14. The update method according to claim 8, wherein the flag is stored in the non-volatile memory.

15. The update method according to claim 8, wherein the internal storage device of the computer system is a hard disk.

* * * * *